United States Patent [19]
Nollen

[11] 3,791,613
[45] Feb. 12, 1974

[54] CABLE CHANNEL

[75] Inventor: Johann Theodor Nollen, Nieuwerkerk a/d Ijssel, Netherlands

[73] Assignee: Verlichtings-en-Metaalwaren Industrie "Gouda-Holland" N.V., Industrieterrein, Haastrecht, Netherlands

[22] Filed: Feb. 16, 1973

[21] Appl. No.: 333,419

[30] Foreign Application Priority Data
Feb. 22, 1972 Netherlands.................. 7202315

[52] U.S. Cl................. 248/49, 174/68 C, 248/68 R
[51] Int. Cl............................................. H02g 3/04
[58] Field of Search.. 174/68 C, 72 A; 248/49, 68 R

[56] References Cited
FOREIGN PATENTS OR APPLICATIONS
437,458  11/1967  Switzerland...................... 174/68 C Primary Examiner—Laramie E. Askin
Attorney, Agent, or Firm—Ralph D. Dinklage

[57] ABSTRACT

A trough-shaped body for channelling electric cables, which body is composed of substantially parallel side walls and substantially parallel bottom members extending between the side walls. The bottom members are secured to the side walls by means of a pin inserted through holes in the bottom members under the apexes of V-shaped depressions in the side walls.

1 Claim, 1 Drawing Figure

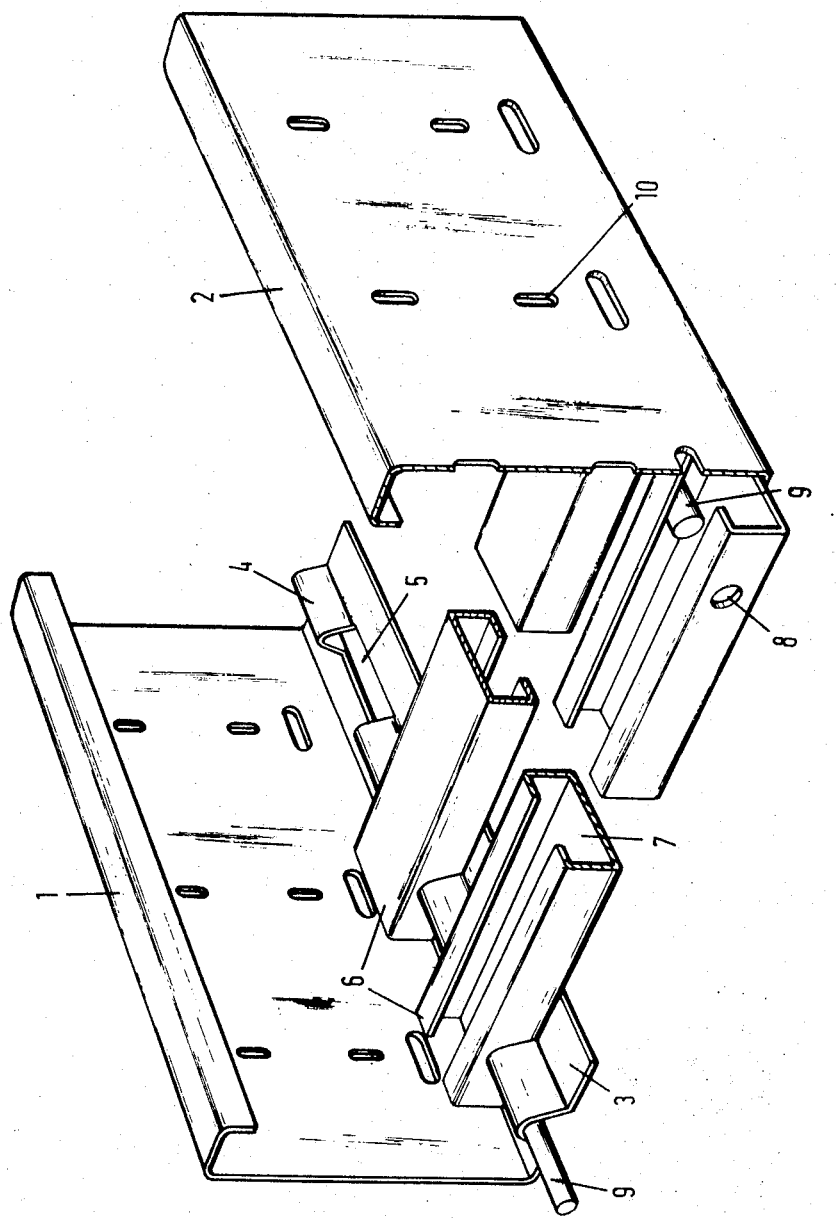

CABLE CHANNEL

The invention relates to a trough-shaped body for channelling electric cables, which body is composed of substantially parallel strip-like side walls of essentially U-shaped cross-section with the legs of the two U's facing each other, a plurality of substantially parallel elongated bottom members of shaped cross-section extending between the side walls, each side wall being of U-shaped cross-section having unequal legs.

A similar device is known from German Gebrauchsmuster No. 7,137,995.

In the device described therein the bottom members are to be mounted in the side walls by moving the bottom members in two right-angled directions relative to each side wall and subsequently securing the bottom member ends to the side walls by welding, riveting, srewing and the like.

In accordance with the invention an improvement thereof is obtained as the largest leg of each side wall comprises a series of substantially V-shaped depressions toward the other leg of the U, the depressions being spaced apart in the longitudinal direction of the trough-shaped body by openings wherein the fitting ends of the bottom member are received and locked by means of a pin inserted through appropriate holes in the bottom member ends under the apexes of the V-shaped depressions.

As a result thereof the bottom members can be disposed in the openings by relative movement in one direction and these bottom members can be secured to the side walls by means of a single pin, so that a simpler and, consequently, economically more attractive method of assembling is achieved.

The invention will be elucidated hereinafter with reference to the drawing showing an embodiment of the invention drawn in perspective and partially cut away.

In this embodiment the trough-shaped body is composed of two substantially parallel strip-like side walls 1 and 2. Each side wall is of U-shaped cross-section having unequal legs. The largest leg 3 of the U comprises V-shaped depressions 4 spaced apart by regularly spaced openings 5. The bottom members 6, which each consist of a rectangular tube having a wide open seam 7, fit in the openings 5.

The ends of each bottom member 6 are each disposed in an opening 5 of a side walls 1 and 2. This can be readily realized by lowering the bottom member end into the opening, using the rounded corners of the bottom member to find this opening.

The bottom member ends are provided with holes 8 aligned in the longitudinal direction of the trough-shaped body, in which holes a fitting pin 9 can be inserted. The holes 8 are located such that, when a bottom member 6 is disposed in an opening 5 with its end substantially touching the respective side wall 1 or 2, the holes 8 are in register with the inside of the apexes of the flanking V-shaped depressions 4 such that a pin 9 inserted through the holes 8 is in fitting engagement with the inside of the apexes of the V-shaped depressions 4, thereby locking the bottom member 6 to the side walls 1 and 2.

It will be clear that in this manner a fast and efficient method of assembling is possible, which can be readily performed both mechanically and manually.

The side walls 1 and 2 and the bottom members 6 may be of electroplated steel plate and may, for example, be enamelled to obtain additional resistance to corrosion, while usually the pin 9 is of stainless steel.

The side walls 1 and 2 may include mounting holes 10.

I claim:

1. A trough-shaped body for channelling electric cables, which body is composed of substantially parallel strip-like side walls of essentially U-shaped cross-section with the legs of the two U's facing each other, a plurality of substantially parallel elongated bottom members of shaped cross-section extending between the side walls, each side wall being of U-shaped cross-section having unequal legs, characterized in that the largest leg (3) of each side wall (1, 2) somprises a series of substantially V-shaped depressions (4) toward the other leg of the U, the depressions being spaced apart in the longitudinal direction of the trough-shaped member by openings (5) wherein the fitting ends of the bottom member (6) are received and locked by means of a pin (9) inserted through appropriate holes (8) in the bottom member ends under the apexes of the V-shaped depressions.

* * * * *